JOHN C. MILLER.
Improvement in Hoes.
No. 123,502.　　　　　　　　　　　　　　Patented Feb. 6, 1872.
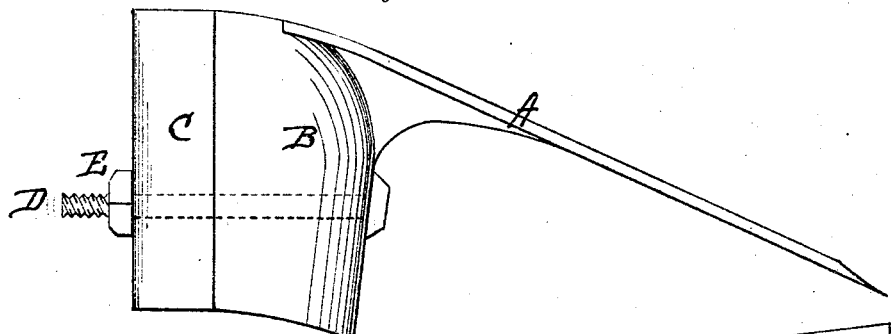
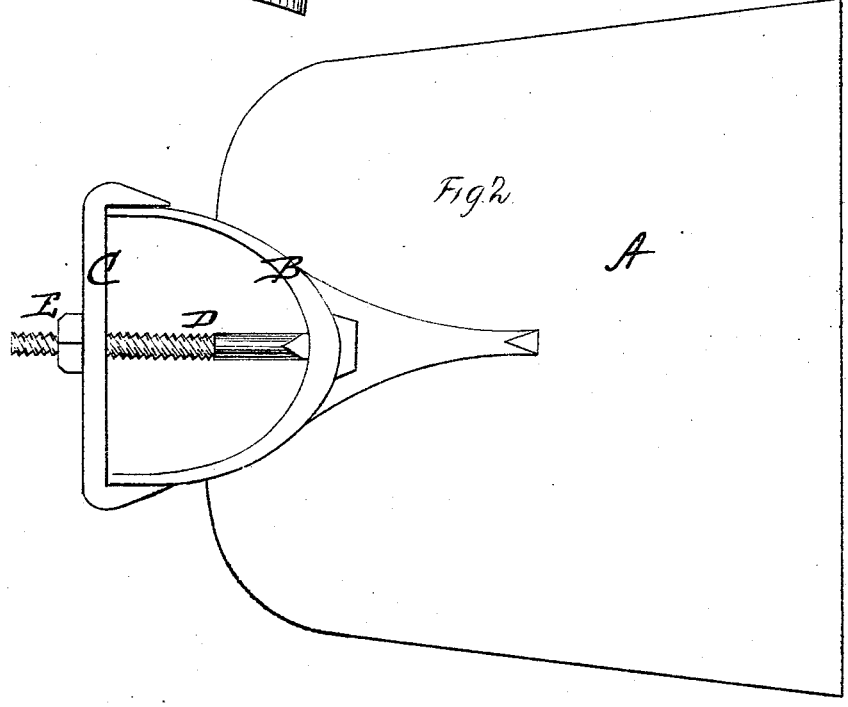
Witnesses:
Jas O. Hutchinson
C. L. Everit.
Inventor
John C. Miller.
per Alexander Mason,
Attorneys.

UNITED STATES PATENT OFFICE.

JOHN C. MILLER, OF DANVILLE, KENTUCKY.

IMPROVEMENT IN HOES.

Specification forming part of Letters Patent No. 123,502, dated February 6, 1872.

*To all whom it may concern:*

Be it known that I, JOHN C. MILLER, of Danville, in the county of Boyle and in the State of Kentucky, have invented certain new and useful Improvements in Hoes; and do hereby declare that the following is a full, clear, and exact description thereof, reference being had to the accompanying drawing and to the letters of reference marked thereon making a part of this specification.

The nature of my invention consists in the peculiar construction of the eye of a hoe, whereby the handle may be readily attached and detached at will, as will be hereinafter more fully set forth.

In order to enable others skilled in the art to which my invention appertains to make and use the same, I will now proceed to describe its construction and operation, referring to the annexed drawing, in which—

Figure 1 is an edge view, and Fig. 2 a side view of a hoe with my improved eye.

A represents a hoe made in any of the known and usual ways, and provided with an eye, B, for the insertion of the handle. This eye is made square or circular or other suitable shape at the bottom and open at the top, so that the handle can be laid into the same from the top.

After the handle is laid into the eye B, a cap, C, is placed on top of the same, completing the eye, said cap having its edges turned down, as shown in Fig. 1, lapping over the sides of the eye. A bolt, D, is then passed upward from underneath through the center of the eye, the handle, and the cap, and secured by a nut, E. By this means the handle is firmly secured to the hoe, and can readily be removed when necessary to sharpen the hoe. The eye B may be either cast with the hoe or welded or riveted to the same, as may be desired.

Having thus fully described my invention, what I claim as new, and desire to secure by Letters Patent, is—

The hoe-eye B, constructed open at the top, covered by an independent cap, C, overlapping the top edges of the hoe-eye, in combination with the screw-bolt D and nut E, whereby the hoe is fastened on the handle by a screw-pressure from a bolt passing immediately through the eye, handle, and cap, substantially as shown and described.

In testimony that I claim the foregoing I have hereunto set my hand this 22d day of October, 1871.

JOHN C. MILLER.

Witnesses:
C. L. EVERT,
A. N. MARR.